(12) United States Patent
Ali et al.

(10) Patent No.: US 7,653,257 B2
(45) Date of Patent: Jan. 26, 2010

(54) ENHANCING VIDEO SEQUENCE SHARPNESS BY ADAPTIVE PEAKING

(75) Inventors: Walid Ali, Chandler, AZ (US); Jorge Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 11/184,688

(22) Filed: Jul. 19, 2005

(65) Prior Publication Data

US 2007/0019880 A1 Jan. 25, 2007

(51) Int. Cl.
*G06K 9/40* (2006.01)
(52) U.S. Cl. ...................................... 382/263
(58) Field of Classification Search ............... 382/263
See application file for complete search history.

(56) References Cited

U.S. PATENT DOCUMENTS

| | | | | |
|---|---|---|---|---|
| 6,097,847 | A * | 8/2000 | Inoue | 382/266 |
| 6,377,313 | B1 * | 4/2002 | Yang et al. | 348/630 |
| 6,549,658 | B1 * | 4/2003 | Schweid et al. | 382/173 |
| 6,600,518 | B1 * | 7/2003 | Bakhmutsky et al. | 348/625 |
| 7,161,633 | B2 * | 1/2007 | Boroczky et al. | 348/606 |
| 7,176,983 | B2 * | 2/2007 | Chiang et al. | 348/630 |
| 7,212,686 | B2 * | 5/2007 | Someya et al. | 382/263 |
| 2005/0248687 | A1 * | 11/2005 | Lee et al. | 348/606 |
| 2006/0279660 | A1 * | 12/2006 | Ali | 348/625 |

FOREIGN PATENT DOCUMENTS

CN          1595954          3/2005

OTHER PUBLICATIONS

A. Murat Tekalp et al., "Identification of Image & Blur Parameters for the restoration of Noncausal Blurs" IEEE Transactions on Acoustics, Speech and Signal Processing vol. 34,No. 4,Aug. 1986, pp. 963-972.
Sung Cheol Park et al., "Super resolution image reconstruction: a technical overview" IEEE Signal Processing Magazine, vol. 20, No. 3, May 2003, pp. 21-36.
Gerald Dehaan et al., "Video processing for multimedia systems", ISBN 9090140158, May 2000, pp. 106-109.

* cited by examiner

*Primary Examiner*—Vikkram Bali
*Assistant Examiner*—Soo Jin Park
(74) *Attorney, Agent, or Firm*—Trop, Pruner & Hu, P.C.

(57) ABSTRACT

A method of selectively sharpening video data may include, for at least some pixels in the video data, generating a sharpening value for a pixel value in an image. The sharpening value may be amplified in a non-linear manner to produce an amplified value. The pixel value and the amplified value may then be combined.

17 Claims, 6 Drawing Sheets

$$\begin{pmatrix} -1 & 0 & -2 & 0 & -1 \\ 0 & 0 & 0 & 0 & 0 \\ -2 & 0 & 12 & 0 & -2 \\ 0 & 0 & 0 & 0 & 0 \\ -1 & 0 & -2 & 0 & -1 \end{pmatrix} \quad 410$$

ENHANCING VIDEO SEQUENCE SHARPNESS BY ADAPTIVE PEAKING

CROSS-REFERENCE TO RELATED APPLICATIONS

The present application is related to application Ser. No. 11/121,483, entitled "Varying Sharpness Based On Motion In Video Sequences" and filed May 4, 2005, the content of which is hereby incorporated by reference, and to application Ser. No. 11/149,813, entitled "Enhancing Sharpness In Video Images" filed Jun. 10, 2005, the content of which is hereby incorporated by reference.

BACKGROUND

Implementations of the claimed invention generally may relate to schemes for enhancing video information and, more particularly, to such schemes that alter the sharpness of the video information.

Video information may be transmitted via a medium in time and/or space for viewing at a separate time and/or location. In some cases, the medium may be a transmission medium, such as carrier waves (e.g., terrestrial and/or cable-carried) or protocol-based data networks. In some cases, the medium may be a storage medium (e.g., tape, hard disk, digital video disc (DVD), etc.) that may store the video information prior to its display. Typically, the video data may be encoded into one of a number of formats before transmission. Some encoding formats may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1.

Such encoding of video information may remove (e.g., by quantizing, etc.) some higher-frequency content in the original video information. The decoded information may appear smoothed and/or somewhat fuzzy when displayed. This phenomenon may not be unique to encoded video data, but may also be present in, for example, transmitted analog video due to impediments in the transmission path. Thus, it may be desirable to increase the sharpness of received and/or decoded video data to improve its perceived picture quality.

Figure 1A:
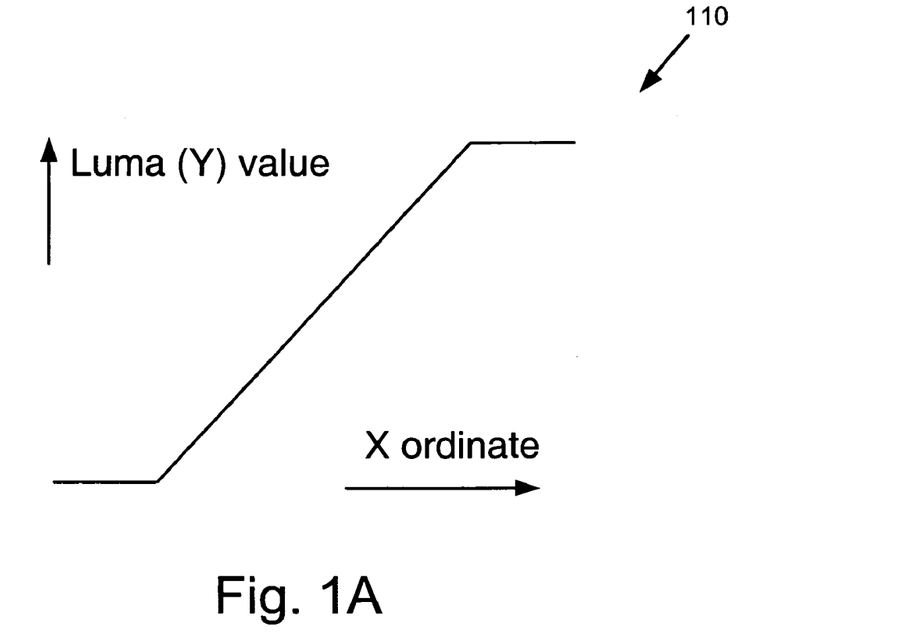
Figure 1B:
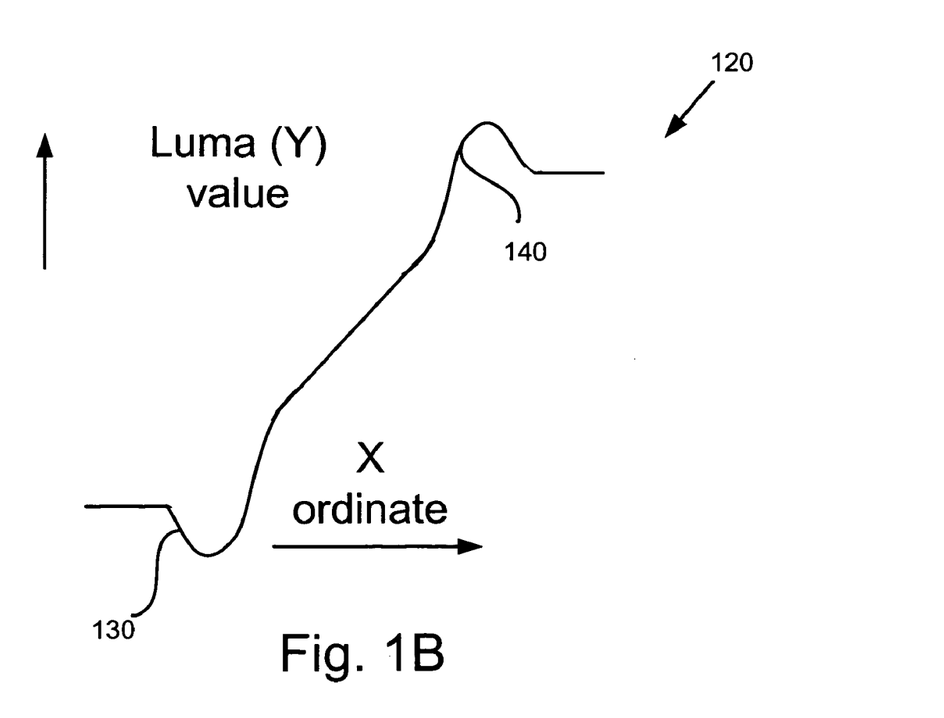

To further introduce the concept of sharpening video, a one-dimensional example will be discussed with regard to FIGS. 1A and 1B. An image in a video sequence may include, for example, luma and chroma signals (e.g., Y, U, and V) sampled in both the horizontal and vertical directions. When the image is roughly uniform in a certain area, the sample values may be substantially the same. When an edge (e.g. a horizontal edge) exists in the image, however, the sample values in the horizontal direction may undergo an abrupt change in value. FIG. 1A illustrates a one-dimensional plot 110 of luma values that change somewhat abruptly over a number of pixels.

To sharpen the video signal, overshoots/undershoots may be generated in the signal (e.g., Y, U or V) by adding the second derivative (e.g., $d^2Y/dx^2$) of plot 110 to itself. FIG. 1B illustrates a plot 120 that has been so sharpened by the addition of undershoot 130 and overshoot 140. Adding overshoot/undershoot 140/130 may boost perceived, higher frequency components. Because plot 120 may have steeper edges than plot 110, its transition may be perceived as visually sharper than that of unsharpened plot 110.

Some schemes for increasing the sharpness of video information, however, may also increase noise within the video information to unacceptable levels.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings, FIGS. 1A and 1B conceptually illustrate sharpening a video signal.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 2:
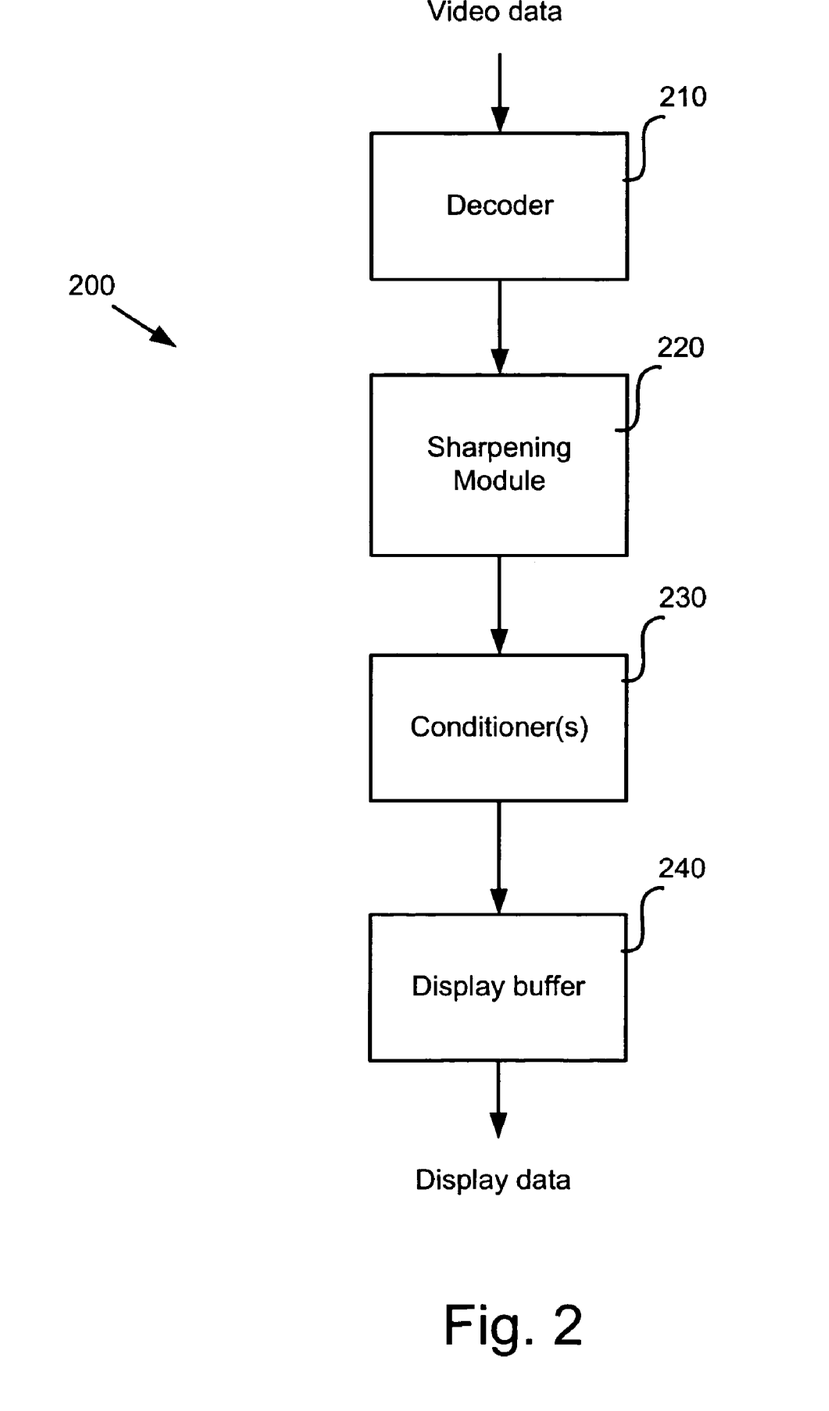
FIG. 2 illustrates a portion of a video display system.

FIG. 2 illustrates a portion of a video display system 200. System 200 may receive video information from any suitable medium, including but not limited to various transmission and/or storage media. Although illustrated as separate functional elements for ease of explanation, any or all of the elements of system 200 may be co-located and/or implemented by a common group of gates and/or transistors. Further, system 200 may be implemented via software, firmware, hardware, or any suitable combination thereof.

The portion of display system 200 shown in FIG. 2 may include a decoder 210, a sharpening module 220, one or more signal conditioner(s) 230, and a display buffer 240. Decoder 210 may, in some implementations, decode encoded video data to produce a stream of video data for further processing. Decoder 210 may decode data encoded in a number of schemes that may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1.

In some implementations, decoder 210 may include a demodulator, for example for received analog video. Such a demodulator may perform a similar function to a digital decoder by extracting a stream of video from a received, modulated signal. In other implementations, decoder 210 may include any other such circuitry and functionality desirable to extract a stream of video pixels that is usable by sharpening module.

Sharpening module 220 may function to selectively sharpen the stream of video from decoder 220. In some implementations, sharpening module 220 may differently sharpen certain portions of a picture in the video stream based on their amplitudes and/or their neighboring pixels.

Figure 3:
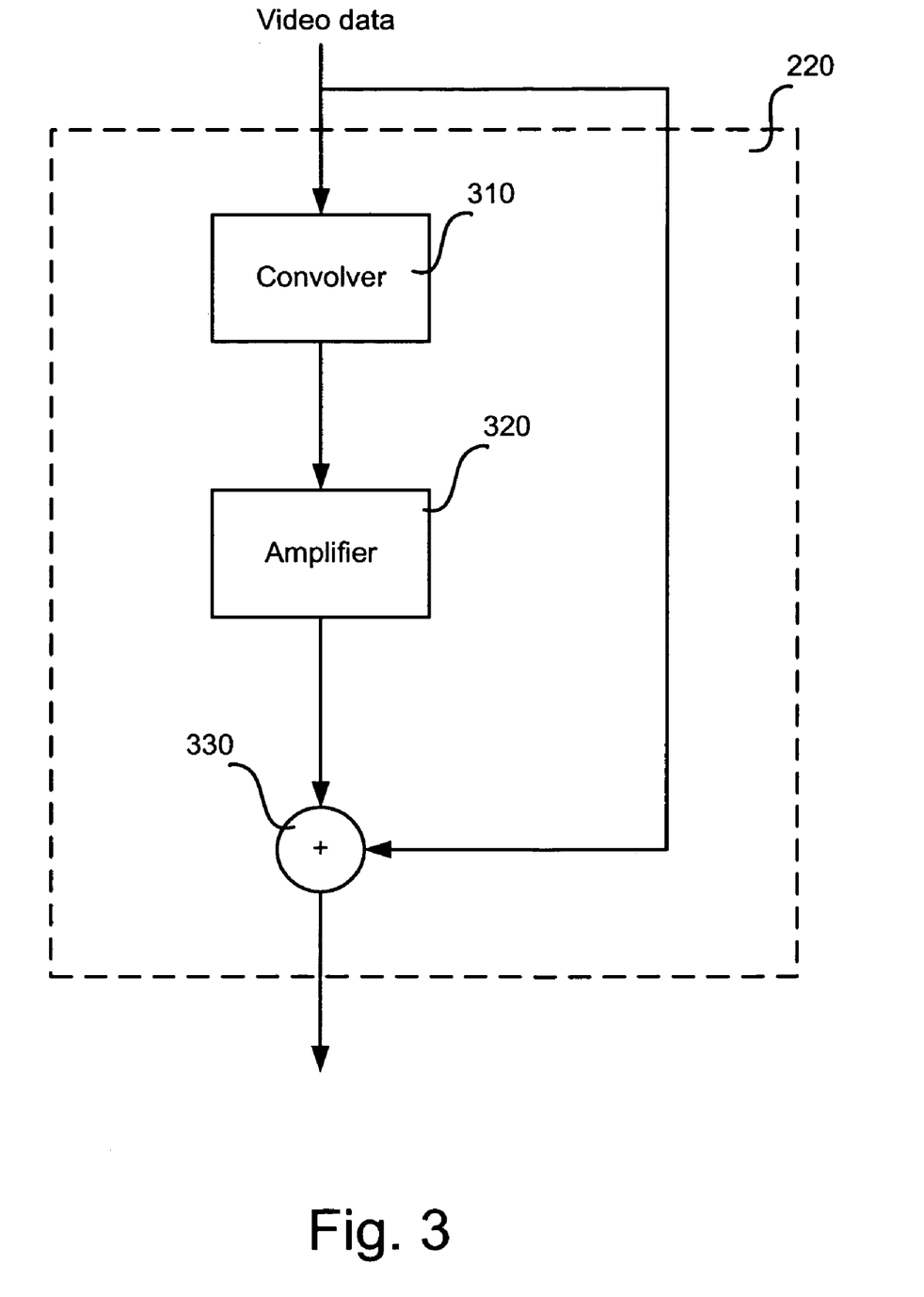
FIG. 3 illustrates an exemplary sharpening module in the system of FIG. 2.

FIG. 3 illustrates an implementation of sharpening module 220. Sharpening module 220 may include a convolver 310, an amplifier 320, and a combiner 330. Although illustrated as being connected in a certain manner for ease of illustration, sharpening module 220 in FIG. 3 may be connected in other configurations. For example, in some implementations, combiner 330 may be located before amplifier 320, instead of after as shown. Other variations are both possible and contemplated.

Convolver 310 may be arranged to sharpen a pixel (e.g., Y, U, and/or V component) of video data by adding content to the pixel. Convolver 310 may convolve a two-dimensional (2D) Laplacian kernel with a number of pixels surrounding the pixel in question to obtain a derivative value. Such derivative value, the output of convolver 310, may be referred to as a sharpening value.

Figure 4:
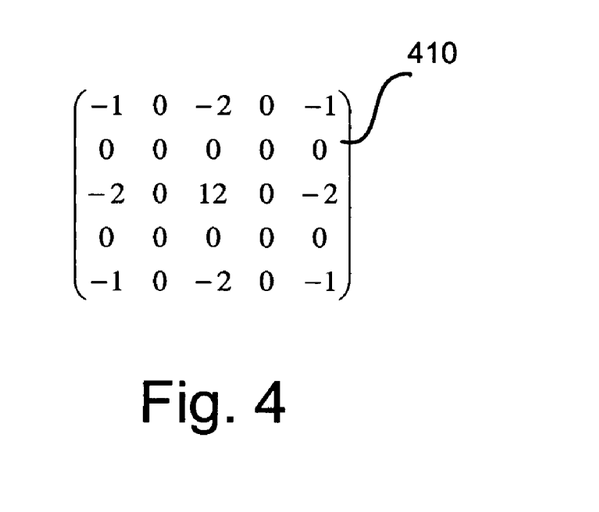
FIG. 4 conceptually illustrates an example convolution kernel.

For example, in some implementations, convolver 310 may use a 5×5 kernel, such as Laplacian convolution kernel 410 shown in FIG. 4. Convolver 310 may convolve kernel 410 with, for example, the 5×5 luma data containing the pixel in question to obtain the 2D derivative of the luma signal. The output of convolver 310 may be, for example, a 7×7 array as a result of convolution of the 5×5 luma (or chroma) data with the 5×5 kernel. The sharpening value output by convolver 310 may be the center value of such resulting array that corresponds to the pixel in question.

Other variations than this specific example are contemplated. For example, a different-sized kernel may be used by convolver 310. In some implementations, the same or different kernels may be used for luma (e.g., Y) and chroma (e.g., U and/or V) video data. In some implementations, only the luma data may be convolved, while passing the chroma data unaltered.

Amplifier 320 may be arranged to selectively increase the sharpening value from convolver 310 to produce an amplified value. In some implementations, amplifier 320 may apply a nonlinear gain curve that depends on the input, sharpening values to produce amplified values. For example, in some implementations, amplifier 320 may not supply (and/or apply) gain to those sharpening values that do not exceed around 5% (or another relatively small threshold) of the overall dynamic range of the pixel values that are input to convolver 310. Such selective amplification by amplifier 320 may avoid amplifying noise below a certain signal level (e.g., preventing "coring" in a final, sharpened pixel value output by combiner 330). Similarly, in some implementations, amplifier 320 also may not supply and/or apply gain to sharpening values that exceed a certain threshold. In this manner, amplifier 320 may also prevent clipping in the final, sharpened pixel value output by combiner 330.

Figure 5:
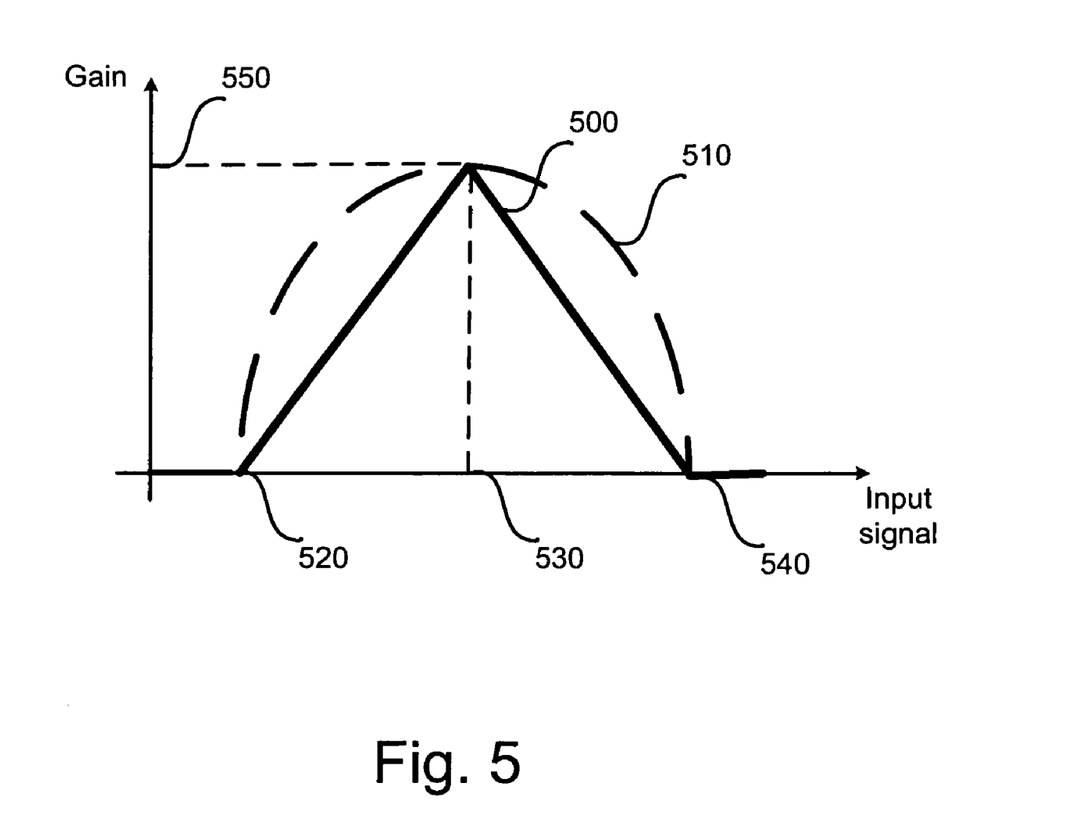
FIG. 5 illustrates an exemplary gain profile of an amplifier in the sharpening module of FIG. 3.

FIG. 5 illustrates an exemplary gain profile 500 of amplifier 320. In some implementations, there may exist a desired or preferred gain profile 510, shown as a dashed line. In the implementation of FIG. 5, gain profile 500 may be a piecewise linear approximation of desired profile 510. Other implementations are possible and contemplated, however, such as a curvilinear approximation of desired profile 510 (e.g., a quadratic or cubic function). In some implementations, desired profile 510 may be implemented exactly, such as via a look-up table.

Gain profile 500 may illustrate the gain (or gain scale factor) of amplifier 320 versus the input signal (e.g., the sharpening value from convolver 310, which may be luminance and/or chrominance). Gain profile 500 may be substantially zero up to a coring point 520, may generally increase between coring point 520 and an intermediate point 530, may generally decrease between intermediate point 520 and a clipping point 540, and may be substantially zero beyond clipping point 540. A maximum value 550 of profile 500 may occur when the input value is at intermediate point 530.

In some implementations, (e.g., where a full scale value of may be 255, corresponding to 8 bits), coring point 520 may be about 40, and intermediate point 530 may be about 50. In some implementations, clipping point 540 may be a suitable value to prevent clipping in the final, sharpened pixel value output by combiner 330. In some implementations, maximum value 550 may be set to 125, almost half of the full scale value. Other values are possible, however. It should be noted that the non-zero portions of gain profile 500 need not be symmetrical about intermediate point 530.

Figure 6:
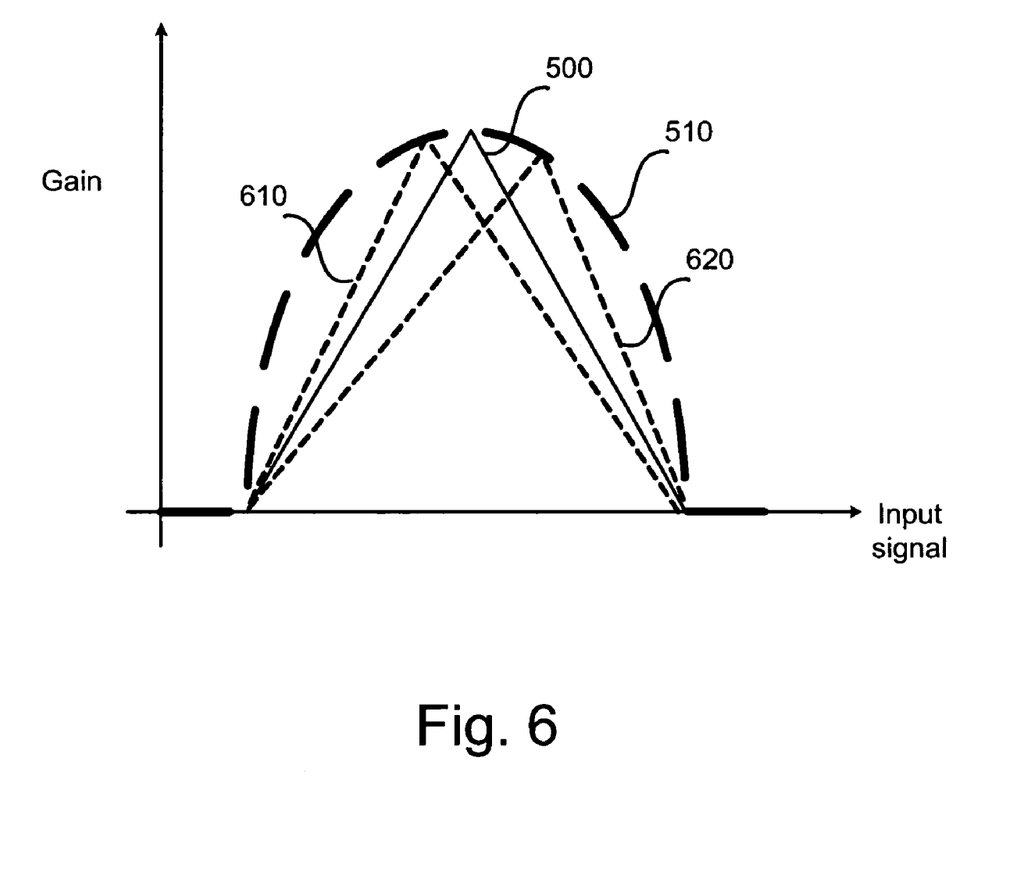
FIG. 6 illustrates other exemplary gain profiles of an amplifier in the sharpening module of FIG. 3.

FIG. 6 illustrates other exemplary gain profiles 610 and/or 620 for amplifier 320, instead of gain profile 500. As may be seen from FIG. 6, gain profile 610 reaches its maximum value at a lower input value than profile 500, while gain profile 620 reaches its maximum value at a higher input value than profile 500. Also, profiles 610 and 620 may not reach their maximum values at the apex of desired profile 510, but rather to one side or the other of the apex. In some implementations, profile 610 may be preferred over profile 500, because a perceptual impact of sharpening at lower luma/choma values may be greater than comparable sharpening at higher values.

Although amplifier 320 (and associated gain profiles in FIGS. 5 and 6) has been described as operating based on the sharpening values output by convolver 310, in some implementations amplifier 320 may operate based on the video data (e.g., pre-sharpened values) input to convolver 310. In some implementations, amplifier 320 may operate based on the combination of the pre-sharpened pixel data and the sharpening values output by convolver 310. Regardless of which data amplifier 320 operates based upon, it may function to prevent coring and/or clipping in the sharpened pixel values output by combiner 330.

Combiner 330 may combine the amplified values from amplifier 320 with pixel values that were input to convolver 310 to output sharpened pixel values. In some implementations, combiner 330 may include an adder to add an amplified value from amplifier 320 to a corresponding unsharpened pixel value. In some implementations, combiner 330 may include other logic to arithmetically (e.g., subtracter, multiplier, etc.) and/or logically (e.g., AND, XOR, etc.) combine an amplified values to corresponding pixel values as appropriate.

Returning to FIG. 2, sharpening module 220 may output enhanced pixel values to one or more conditioner(s) 230 that may further condition the pixels. Conditioner(s) 230 may include, for example, one or more of deinterlacing, noise reduction, scaling, and/or other signal conditioning functionality. Conditioner(s) 230 may be implemented via dedicated hardware, firmware, software, or some combination thereof to perform one or more signal conditioning functions after the sharpening performed by sharpening module 220.

Display buffer 240 may receive video data from conditioner(s) 230, and may temporarily store at least some of such data prior to its output to a display device (not shown). In addition to a buffering (e.g., storage) function, display buffer 240 may perform other display-related tasks, such as synchronizing its output signal to a timing or sync signal to facilitate display. Other functionality that is typically found in display buffers may also be present in display buffer 240.

Figure 7:
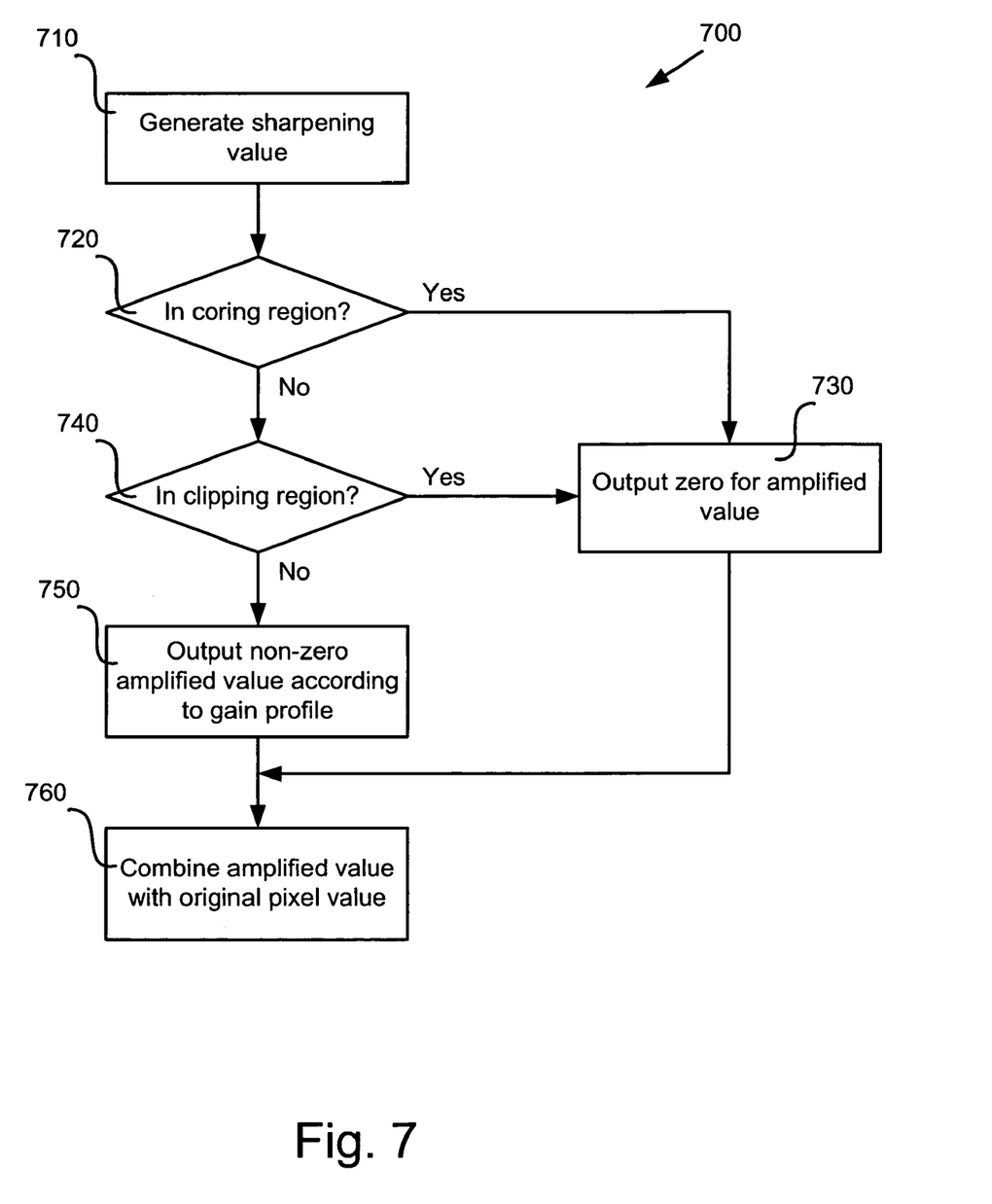
FIG. 7 illustrates an exemplary process of selectively changing the sharpness of video data.

FIG. 7 illustrates an example process 700 of selectively changing the sharpness of video data. Although FIG. 7 may be described with regard to sharpening module 220 in FIGS. 2 and 3 for ease and clarity of explanation, it should be understood that process 700 may be performed by other hardware and/or software implementations.

Processing may begin by generating a sharpening value [act 710]. The sharpening value may be generated, as previously described, by convolver 310.

Processing may continue with amplifier 320 outputting zero [act 730] if the sharpening value (or whatever the amplifier's input signal is) falls in a coring region [act 720] or a clipping region [act 740]. With reference to FIG. 5, input values below coring point 520 may be in the coring region, and input values above clipping point 540 may be in the clipping region.

Amplifier 320 may output a non-zero amplified value according to a gain profile if its input value falls between the coring and clipping regions [act 750]. In some implementations, the gain profile used to generate the amplified value may include profile 500. In some implementations, the gain profile used may differ (e.g., may not be piecewise linear), but may also generally increase to an intermediate point (e.g., point 530) and then decrease after the intermediate point. It should be noted that the intermediate point need not be located symmetrically with regard to the clipping and coring points of the gain profile used.

Combiner 330 may combine the amplified value that is output by amplifier 320 with the original pixel value that is the input to convolver 310 to produce a sharpened pixel value [act 760]. Depending on the input to amplifier 320, this amplified value may be zero [act 730] or non-zero [act 740]. Hence, the term "sharpened pixel value" does not necessarily denote that every pixel value has been sharpened, because some amplified values may be zero. Rather, the sharpened pixel values output by combiner 330 may have been selectively and/or differently sharpened due to the operation of amplifier 320 on the sharpening values from convolver 310.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although the scheme described herein may be performed on a pixel-by-pixel basis, it may also be performed for aggregations or groups of pixels in an image.

Further, the acts in FIG. 7 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method, comprising:
    generating a sharpening value for a pixel value in an image;
    amplifying the sharpening value in a non-linear manner, said amplifying to increase with sharpening values between a first sharpening value and a second sharpening value and decrease with increasing sharpening values between the second sharpening value and a third sharpening value, wherein the second sharpening value is closer to the first sharpening value than to the third sharpening value;
    combining the pixel value and the amplified value; and
    using said combined pixel value and amplified value to display the image.

2. The method of claim 1, wherein the generating includes: convolving the pixel value and a number of surrounding pixels with a kernel to produce a sharpened pixel array.

3. The method of claim 1, wherein the amplifying includes: applying a zero gain to the sharpening value if the sharpening value falls below a coring point.

4. The method of claim 1, wherein the amplifying includes: applying a zero gain to the sharpening value if the sharpening value falls above a clipping point.

5. The method of claim 1, wherein the amplifying includes: applying a gain function to the sharpening value if the sharpening value falls within a predetermined region.

6. The method of claim 5, wherein gain function increases up to an intermediate point in its input value and decreasing after the intermediate point.

7. An apparatus, comprising:
    a sharpening portion to sharpen a pixel of video data and output a sharpening value;
    an amplifier to apply a gain to the sharpening value to produce an altered value, when the gain changes a sharpening value function, wherein the gain applied by the amplifier increases with sharpening values between a first sharpening value and a second sharpening value and decreases with increasing sharpening values between the second sharpening value and a third sharpening value, wherein the second sharpening value is closer to the first sharpening value than to the third sharpening value; and
    a combiner to combine the altered value and the pixel of video data and to output an output pixel value.

8. The apparatus of claim 7, wherein the sharpening portion includes: a convolver to convolve the pixel and a number of surrounding pixels with a similarly sized kernel.

9. The apparatus of claim 7, wherein the amplifier applies a zero gain to sharpening values less than the first sharpening value or greater than the third sharpening value.

10. The apparatus of claim 7, further comprising: a deinterlacing module, a noise reduction module, or a scaling module operatively coupled to an output of the combiner to further condition the enhanced pixel value.

11. The apparatus of claim 7, further comprising: a display buffer operatively coupled to an output of the combiner to buffer enhanced pixel values before display.

12. A computer readable storage medium storing instructions executed by a computer to implement a method comprising:
    generating a sharpening value for a pixel value in an image;
    amplifying the sharpening value in a non-linear manner, said amplifying to increase with sharpening values between a first sharpening value and a second sharpening value and decrease with increasing sharpening values between the second sharpening value and a third sharpening value, wherein the second sharpening value is closer to the first sharpening value than to the third sharpening value; and combining pixel value and the amplified value.

13. The medium of claim 12, wherein the generating includes: convolving the pixel value and a number of surrounding pixels with a kernel to produce a sharpened pixel array.

14. The medium of claim 12, wherein the amplifying includes: applying a zero gain to the sharpening value if the sharpening value falls below a coring point.

15. The medium of claim 12, wherein the amplifying includes: applying a zero gain to the sharpening value if the sharpening value falls above a clipping point.

16. The medium of claim 12, wherein the amplifying includes: applying a gain function to the sharpening value if the sharpening value falls within a predetermined region.

17. The medium of claim 16, wherein gain function increases up to an intermediate point in its input value and decreases after the intermediate point.

* * * * *

UNITED STATES PATENT AND TRADEMARK OFFICE
CERTIFICATE OF CORRECTION

PATENT NO. : 7,653,257 B2 Page 1 of 1
APPLICATION NO. : 11/184688
DATED : January 26, 2010
INVENTOR(S) : Ali et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 620 days.

Signed and Sealed this

Twenty-eighth Day of December, 2010

David J. Kappos
*Director of the United States Patent and Trademark Office*